US009585132B2

(12) United States Patent
Wu et al.

(10) Patent No.: US 9,585,132 B2
(45) Date of Patent: Feb. 28, 2017

(54) WHITE SPACE RESOURCE ACQUISITION METHOD, WHITE SPACE RESOURCE REQUEST DEVICE, AND SYSTEM

(71) Applicant: Huawei Technologies Co., Ltd., Shenzhen (CN)

(72) Inventors: Yizhuang Wu, Beijing (CN); Yang Cui, Tokyo (JP)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/743,698

(22) Filed: Jun. 18, 2015

(65) Prior Publication Data
US 2015/0289258 A1 Oct. 8, 2015

Related U.S. Application Data

(63) Continuation of application No. PCT/CN2013/086580, filed on Nov. 5, 2013.

(30) Foreign Application Priority Data

Dec. 18, 2012 (CN) .......................... 2012 1 0551984

(51) Int. Cl.
H04B 15/00 (2006.01)
H04W 72/04 (2009.01)
(Continued)

(52) U.S. Cl.
CPC ....... *H04W 72/0413* (2013.01); *H04W 16/14* (2013.01); *H04W 72/0453* (2013.01); *H04W 72/082* (2013.01)

(58) Field of Classification Search
CPC . H04W 16/14; H04W 72/0406; H04W 84/12; H04W 52/243; H04W 8/20;
(Continued)

(56) References Cited

U.S. PATENT DOCUMENTS

2007/0049227 A1 3/2007 Su
2011/0195667 A1 8/2011 Hassan et al.
(Continued)

FOREIGN PATENT DOCUMENTS

CN 1870626 A 11/2006
CN 101043505 A 9/2007
(Continued)

*Primary Examiner* — Shaima Q Aminzay
(74) *Attorney, Agent, or Firm* — Slater Matsil, LLP

(57) ABSTRACT

The white space resource acquisition method provided according to the embodiments of the present invention includes: receiving, by a white space resource request device, a white space resource request message sent by a white space device; and sending, by the white space resource request device, a white space resource response message to the white space device, where the white space resource response message includes white space resource information that is requested from a white space database and that is corresponding to first white space requirement information of the white space device. According to the white space resource acquisition method provided in the embodiments of the present invention, a white space resource request device requests, based on the PAWS protocol, white space resource information from a white space database, and interaction between a white space device and the white space resource request device may be established by using an existing protocol.

20 Claims, 10 Drawing Sheets

(51) Int. Cl.
*H04W 16/14* (2009.01)
*H04W 72/08* (2009.01)

(58) Field of Classification Search
CPC ....... H04W 24/02; H04W 4/02; H04W 92/18; H04W 24/00; H04W 36/06; H04W 72/0453; H04W 72/082
USPC .. 455/501, 62, 67.7, 434, 454, 456.1, 456.2, 455/509, 552.1, 552.2; 370/252, 329, 370/338; 707/769
See application file for complete search history.

(56) References Cited

U.S. PATENT DOCUMENTS

| | | |
|---|---|---|
| 2011/0268095 A1 | 11/2011 | Kim et al. |
| 2012/0093092 A1 | 4/2012 | Kasslin et al. |
| 2012/0165056 A1 | 6/2012 | Kim et al. |

FOREIGN PATENT DOCUMENTS

| | | |
|---|---|---|
| CN | 102412919 A | 4/2012 |
| CN | 102742182 A1 | 10/2012 |
| CN | 103582156 A | 2/2014 |

WHITE SPACE RESOURCE ACQUISITION METHOD, WHITE SPACE RESOURCE REQUEST DEVICE, AND SYSTEM

CROSS-REFERENCE TO RELATED APPLICATIONS

This application is a continuation of International Application No. PCT/CN2013/086580, filed on Nov. 5, 2013, which claims priority to Chinese Patent Application No. 201210551984.3, filed on Dec. 18, 2012, both of which are hereby incorporated by reference in their entireties.

TECHNICAL FIELD

Embodiments of the present invention relate to wireless communications technologies, and in particular, to a white space resource acquisition method, a white space resource request device, and a system.

BACKGROUND

Main content of studies on white space technologies is to provide a mechanism in which a secondary user uses, at a specified time and place, a spectrum resource not used by a primary user, and the secondary user cannot cause interference to the primary user in a spectrum using process.

In the prior art, a white space is applied mainly in a manner of querying a white space database (database). Specifically, the white space database performs centralized management on a white space resource and records information such as time when the white space resource can be used by a secondary user and a geographic location of the white space resource. When the secondary user needs to use a white space resource, the secondary user can initiate a procedure for requesting a white space resource, and reports, to the database, white space resource selection information such as a geographic location or required bandwidth, and the database allocates a white space resource according to the white space resource selection information reported by the secondary user and white space resource information stored in the database. In the prior art, user equipments using a white space may be grouped as master white space devices (master WSD) and slave WSDs (slave WSD) according to capabilities to access the database. A master WSD must support the PAWS protocol, so as to directly acquire an available white space resource from the database by using a PAWS protocol packet; however, a slave WSD cannot perform direct communication with the database, and needs to acquire an available white space resource from the database by using the master WSD.

In the foregoing prior art, all master WSDs or all network nodes supporting functions of a master WSD must support the PAWS protocol to acquire a white space resource from the database; therefore, flexibility of network deployment is relatively poor.

SUMMARY

Embodiments of the present invention provide a white space resource acquisition method, a white space resource request device, and a system, so as to overcome a restriction that, in a current method for using a white space resource, all white space devices need to support the PAWS protocol to acquire and utilize a white space.

According to a first aspect, an embodiment of the present invention provides a white space resource acquisition method, including: receiving, by a white space resource request device, a white space resource request message sent by a white space device; and sending, by the white space resource request device, a white space resource response message to the white space device, where the white space resource response message includes white space resource information that is requested from a white space database and that is corresponding to first white space requirement information of the white space device.

Further, before the sending, by the white space resource request device, a white space resource response message to the white space device, the method further include: determining, by the white space resource request device, whether a white space resource pre-acquired from the white space database includes a white space resource corresponding to the first white space requirement information of the white space device; and if yes, allocating, by the white space resource request device, the white space resource corresponding to the first white space requirement information of the white space device to the white space device.

Further, if the white space resource pre-acquired from the white space database does not include the white space resource corresponding to the first white space requirement information of the white space device, the method further includes sending the white space device an indication message used to indicate that no white space resource is available.

Further, if the white space resource pre-acquired from the white space database does not include the white space resource corresponding to the first white space requirement information of the white space device, the method further includes sending, by the white space resource request device, a first resource acquisition request message to the white space database, where the first resource acquisition request message includes the first white space requirement information of the white space device; and receiving, by the white space resource request device, a first resource acquisition response message sent by the white space database, where the first resource acquisition response message includes the white space resource corresponding to the first white space requirement information of the white space device.

Further, the method further includes determining, by the white space resource request device, that the white space device needs to update a white space resource and/or determines, according to a pre-defined policy, that the white space device needs to be activated; sending, by the white space resource request device, a white space resource reconfiguration message to the white space device, where the white space resource reconfiguration message includes the white space resource corresponding to the first white space requirement information of the white space device; and receiving a white space resource reconfiguration response message sent by the white space device.

Further, before the determining whether a white space resource pre-acquired from the white space database includes a white space resource corresponding to the first white space requirement information of the white space device, the method further includes sending, by the white space resource request device, a second resource acquisition request message to the white space database, where the second resource acquisition request message includes second white space requirement information of the white space resource request device; and receiving, by the white space resource request device, a second resource acquisition response message sent by the white space database, where the second resource acquisition response message includes a white space resource corresponding to the second white space requirement information of the white space resource request device.

Further, the receiving, by a white space resource request device, a white space resource request message sent by a white space device includes receiving, by the white space resource request device, a white space resource request message that is sent by the white space device and that includes the first white space requirement information of the white space device.

Further, before the receiving, by a white space resource request device, a white space resource request message sent by a white space device, the method further includes receiving, by the white space resource request device, a connection request message that is sent by the white space device and that includes the first white space requirement information of the white space device.

Further, the first white space requirement information includes white space frequency band information supported by the white space device and/or a parameter required for the white space database to allocate a resource to the white space device.

Further, the second white space requirement information includes white space information supported by the white space resource request device and/or a parameter required for the white space database to allocate a resource to the white space resource request device.

According to a second aspect, an embodiment of the present invention provides a white space resource acquisition method, including sending, by a white space device, a white space resource request message to a white space resource request device; and receiving a white space resource response message sent by the white space resource request device, where the white space resource response message includes white space resource information that is requested by the white space resource request device from a white space database and that is corresponding to first white space requirement information of the white space device.

Further, the receiving a white space resource response message sent by the white space resource request device includes receiving an indication message that is sent by the white space resource request device and that is used to indicate that no white space resource is available.

Further, the white space device receives a white space resource reconfiguration message sent by the white space resource request device, where the white space resource reconfiguration message includes a white space resource corresponding to the first white space requirement information of the white space device; and sends a white space resource reconfiguration response message to the white space resource request device.

Further, the sending a white space resource request message to a white space resource request device includes sending a white space resource request message that includes the first white space requirement information of the white space device to the white space resource request device.

Further, before the sending a white space resource request message to a white space resource request device, the method further includes sending a connection request establishment message to the white space resource request device, where the connection request message includes the first white space requirement information of the white space device.

Further, the first white space requirement information includes white space frequency band information supported by the white space device and/or a parameter required for the white space database to allocate a resource to the white space device.

According to a third aspect, an embodiment of the present invention provides a white space resource request device, including a receiving module, configured to receive a white space resource request message sent by a white space device; and a sending module, configured to, after the receiving module receives the white space resource request message, send a white space resource response message to the white space device, where the white space resource response message includes white space resource information that is requested from a white space database and that is corresponding to first white space requirement information of the white space device.

Further, the white space resource request device further includes a determining module, configured to determine whether a white space resource pre-acquired from the white space database includes a white space resource corresponding to the first white space requirement information of the white space device; and an allocating module, configured to, after the determining module determines that the white space resource pre-acquired from the white space database includes the white space resource corresponding to the first white space requirement information of the white space device, allocate, to the white space device, the white space resource corresponding to the first white space requirement information of the white space device.

Further, the sending module is further configured to, after the determining module determines that the white space resource pre-acquired from the white space database does not include the white space resource corresponding to the first white space requirement information of the white space device, send the white space device an indication message used to indicate that no white space resource is available.

Further, the sending module is further configured to, after the determining module determines that the white space resource pre-acquired from the white space database does not include the white space resource corresponding to the first white space requirement information of the white space device, send a first resource acquisition request message to the white space database, where the first resource acquisition request message includes the first white space requirement information of the white space device; and the receiving module is configured to, after the sending module sends the first resource acquisition request message, receive a first resource acquisition response message sent by the white space database, where the first resource acquisition response message includes the white space resource corresponding to first white space requirement information of the white space device.

Further, the white space resource request device further includes a reconfiguration module, configured to determine that the white space device needs to update a white space resource or determine, according to a pre-defined policy, that the white space device needs to be activated, and send a white space resource reconfiguration message to the white space device, where the white space resource reconfiguration message includes the white space resource corresponding to the first white space requirement information of the white space device; and the receiving module is further configured to, after the reconfiguration module sends the white space resource reconfiguration message, receive a white space resource reconfiguration response message sent by the white space device.

Further, the sending module is further configured to send a second resource acquisition request message to the white space database, and receive a second resource acquisition response message sent by the white space database, where the second resource acquisition request message includes second white space requirement information of the white space resource request device, and the second resource acquisition response message includes a white space resource corresponding to the second white space requirement information of the white space resource request device.

Further, the receiving module is further configured to receive a first white space resource request message that is sent by the white space device and that includes the first white space requirement information of the white space device.

Further, the receiving module is further configured to receive a connection request message that is sent by the white space device and that includes the first white space requirement information of the white space device.

Further, the white space resource information that is sent by the sending module and that is corresponding to the first white space requirement information includes white space frequency band information supported by the white space device and/or a parameter required for the white space database to allocate a resource to the white space device.

Further, the second white space requirement information determined by the determining module includes white space information supported by the white space resource request device and/or a parameter required for the white space database to allocate a resource to the white space resource request device.

According to a fourth aspect, an embodiment of the present invention provides a white space device, including: a sending module, configured to send a white space resource request message to a white space resource request device; and a receiving module, configured to, after the sending module sends the white space resource request message, receive a white space resource response message sent by the white space resource request device, where the white space resource response message includes white space resource information that is requested by the white space resource request device from a white space database and that is corresponding to first white space requirement information of the white space device.

Further, the receiving module is configured to receive an indication message that is sent by the white space resource request device and that is used to indicate that no white space resource is available.

Further, a reconfiguration module is configured to, after the receiving module receives a white space resource reconfiguration message sent by the white space resource request device, send a white space resource reconfiguration response message to the white space resource request device, where the white space resource reconfiguration message includes a white space resource corresponding to the first white space requirement information of the white space device.

Further, the sending module is further configured to send a white space resource request message that includes the first white space requirement information of the white space device to the white space resource request device.

Further, the sending module is further configured to send a connection request establishment message to the white space resource request device, where the connection request message includes the first white space requirement information of the white space device.

According to a fifth aspect, an embodiment of the present invention provides a white space resource acquisition system, including any of the foregoing white space resource request devices.

According to the white space resource acquisition method, the white space resource request device, and the system that are provided in the embodiments of the present invention, a white space device sends a white space resource request message to a white space resource request device; the white space resource request device requests, in advance or after receiving the white space resource request message, white space resource information corresponding to first white space requirement information of the white space device and sends a slave device the white space resource information corresponding to the requirement information, so as to utilize a white space resource. The white space resource request device requests the white space resource information from the database based on the PAWS protocol, and interaction between the white space device and the white space resource request device can be established by using an existing protocol, so that the white space device does not need to establish a connection to the database so as to acquire a white space resource, and no new interface needs to be defined to support the PAWS protocol.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
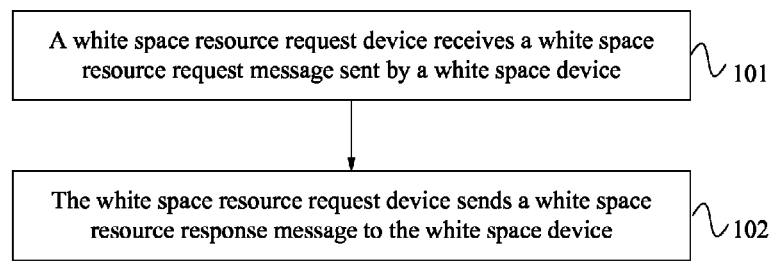
FIG. 1 is a flowchart of a first Embodiment of a white space resource acquisition method according to the present invention.

FIG. 1 is a flowchart of Embodiment 1 of a white space resource acquisition method according to the present invention. A procedure of this embodiment may be specifically implemented by a white space resource request device. As shown in FIG. 1, according to the white space resource acquisition method provided in this embodiment, the white space resource request device receives a white space resource request message sent by a white space device. The method provided in this embodiment may include the following steps.

Step 101: The white space resource request device receives the white space resource request message sent by the white space device.

The white space resource request device receives, based on the PAWS protocol or another existing protocol, the white space resource request message sent by the white space device, where the white space resource request message includes a white space frequency band, location information, and transmit power supported by the white space device.

Step 102: The white space resource request device sends a white space resource response message to the white space device.

After receiving the white space resource request message sent by the white space device, the white space resource request device sends white space resource information that is requested from a white space database based on the PAWS protocol and that is corresponding to first white space requirement information of the white space device, and sends a white space resource response message to the white space device.

According to the white space acquisition method provided in this embodiment of the present invention, a white space device sends a white space resource request message to a white space resource request device; the white space resource request device requests, in advance or after receiving the white space resource request message, white space resource information corresponding to first white space requirement information of the white space device and sends a slave device the white space resource information corresponding to the requirement information, so as to utilize a white space resource. In the foregoing process, the white space resource request device requests the white space resource information from a white space database based on the PAWS protocol, and interaction between the white space device and the white space resource request device can be established by using an existing protocol, so that the white space device does not need to establish a connection to the database so as to acquire a white space resource, and no new interface needs to be defined to support the PAWS protocol.

In the foregoing embodiment, if the white space resource request device has recently executed the PAWS protocol to query a white space resource in the database, a white space resource that is acquired from the white space database and that is supported by the white space resource request device is stored in the white space resource request device. Therefore, after the white space resource request message sent by the white space device is received, it is determined, according to white space frequency band information in the white space resource request message, whether a white space resource pre-acquired from the white space database has white space frequency band information supported by the white space device, that is, whether a white space resource corresponding to the first white space requirement information of the white space device is included; if yes, the white space resource corresponding to the first white space requirement information of the white space device is allocated to the white space device. For example, the white space resource request device may allocate a part or all of the stored white space resource to the white space device according to a specific policy, so that the white space device selects a white space resource for use from the allocated white space resource; otherwise, an indication message used to indicate that no white space resource is available is sent to the white space device.

In the foregoing embodiment, when the white space resource request device determines that an available white space resource stored in the white space resource request device does not include an available white space resource corresponding to the white space requirement information of the white space device, the white space resource request device sends a first resource acquisition request message to the white space database according to the received white space resource request message, where the first resource acquisition request message carries the first white space requirement information of the white space device. The white space database performs a query according to the first resource acquisition request message and feeds back a white space resource to the white space resource request device, and sends a first resource acquisition response message to the white space resource request device, where the first resource acquisition response message carries the white space resource corresponding to the first white space requirement information of the white space device.

In this embodiment, the white space resource request device may send the first resource acquisition request message to the white space database according to the first white space requirement information of the white space device, so as to query and acquire a white space resource supporting the white space device.

In addition, the white space resource request device may periodically monitor the white space device, and when a condition such as an exception occurs in a network, for example, when the white space resource request device detects that a white space currently used by the white space device has expired, or determines, according to a pre-defined policy, that the white space device needs to be activated, the white space resource request device sends a white space resource reconfiguration message to the white space device, where the reconfiguration message carries other white space frequency band information that supports using by the white space device. After receiving the white space resource reconfiguration message, the white space device sends a white space resource reconfiguration response message to the white space resource request device. The white space resource request message that is sent by the white space device and that is received by the white space resource request device includes the first white space requirement information of the white space device.

In the foregoing embodiment of the present invention, before determining whether the white space resource pre-acquired from the white space database includes the white space resource corresponding to the first white space requirement information of the white space device, the white space resource request device may initiate a white space database query according to a policy of the white space resource request device, so as to acquire a white space resource. Specifically, for example, if the white space resource request device has not executed the PAWS protocol recently to acquire an available white space resource from the white space database, the white space resource request device can send a second resource acquisition request message that includes second white space requirement information of the white space resource request device to the white space database, to perform a query in the database and acquire an available white space resource supporting the white space resource request device. The white space database sends a second resource acquisition response message to the white space resource request device according to the second resource acquisition request message, where the second resource acquisition response message includes a white space resource corresponding to the second white space requirement information of the white space resource request device.

In the foregoing embodiment of the present invention, the white space resource request device performs, based on the PAWS protocol, a query in the white space database and acquires an available white space resource supporting the white space resource request device, and whether an act of performing a query in the white space database is initiated is determined by the white space resource request device according to a policy of the white space resource request device. After receiving the white space resource request message sent by the white space device that establishes a connection to the white space resource request device based on an existing protocol, the white space resource request device determines, according to the first white space requirement information in the white space resource request message, the stored available white space resource supporting the white space resource request device and allocates the white space resource to the white space device.

In the foregoing embodiment of the present invention, before the white space resource request device receives the white space resource request message sent by the white space device, the white space resource request device establishes a connection to the white space device. When establishing a connection to the white space resource request device, the white space device sends a connection request message that includes the first white space requirement information of the white space device to the white space resource request device, to report a white space capability of the white space device to the white space resource request device, so that the white space resource request device learns about the white space capability, such as white space frequency band information, location information, and transmit power, of the white space device at the time of establishing the connection, and the white space resource request device allocates an available white space resource to the white space device according to the first white space requirement information in the connection request message, or updates a white space used by the white space device when the white space needs to be updated.

In the foregoing embodiment, the first white space requirement information of the white space device includes white space frequency band information supported by the white space device and/or a parameter required for the white space database to allocate a resource to the white space device. For example, all white space capability information such as the white space frequency band information and/or the location information that can indicate the white space capability of the white space device; the second white space requirement information is white space information supported by the white space resource request device and/or a parameter required for the white space database to allocate a resource to the white space resource request device.

In the foregoing embodiment, the white space resource request device performs communication with the white space database based on the PAWS protocol, and the white space device may establish, for example, radio resource control (RRC) message communication or Diameter protocol (diameter protocol) communication with the white space resource request device.

In the foregoing embodiment of the present invention, multiple white space devices may be connected to the white space resource request device, and the multiple white space devices each request a white space resource from the white space resource request device, and separately report their own white space capability information such as white space frequency band information, location information, and transmit power. The white space resource request device sets the white space capability information as a policy of the white space resource request device, queries available white space information in the white space database according to the policy of the white space resource request device, and stores the available white space information. The white space device sends a request to the white space resource request device as required, and the white space resource request device returns a response message that carries white space frequency band information supporting the white space device that initiates the request. Specifically, the white space device may be, for example, a master white space device or a slave white space device. A master white space device may establish a connection to the white space resource request device based on an existing protocol, so as to acquire a white space resource. In addition to establishing a connection to the white space resource request device based on an existing protocol, a slave white space device may also be connected to a master white space device, and acquire an available white space resource by using the master white space device.

Figure 2:
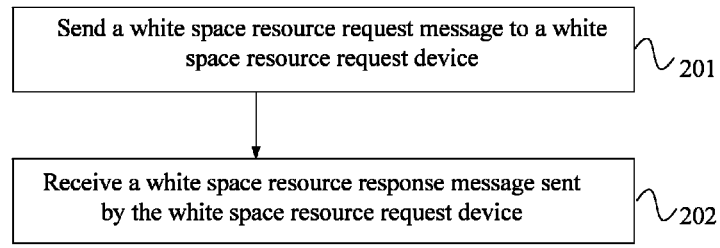
FIG. 2 is a flowchart of a second Embodiment of a white space resource acquisition method according to the present invention.

FIG. 2 is a flowchart of Embodiment 2 of a white space resource acquisition method according to the present invention. A procedure of this embodiment may specifically be implemented by a white space device. As shown in FIG. 2, according to the white space acquisition method provided in this embodiment, the white space device requests a white space resource from a white space resource request device. The method provided in this embodiment may include the following steps.

Step 201: Send a white space resource request message to the white space resource request device.

The white space device sends the white space resource request message to the white space resource request device, where the white space resource request message may be a message that includes first white space requirement information of the white space device and that is sent based on the PAWS or based on another protocol.

Step 202: Receive a white space resource response message sent by the white space resource request device.

After receiving the white space resource request message, the white space resource request device requests, according to the message, white space resource information corresponding to the first white space requirement information of the white space device, and feeds back the white space resource response message to the white space device. The white space device receives the white space resource response message, where the white space resource response message includes the white space resource information corresponding to the first white space requirement information of the white space device.

According to the white space acquisition method provided in this embodiment of the present invention, a white space device sends a white space resource request message to a white space resource request device; the white space resource request device requests, in advance or after receiving the white space resource request message, white space resource information corresponding to first white space requirement information of the white space device and sends a slave device the white space resource information corresponding to the requirement information, so as to utilize a white space resource. In the foregoing process, the white space resource request device requests the white space resource information from a white space database based on the PAWS protocol, and interaction between the white space device and the white space resource request device can be established by using an existing protocol, so that the white space device does not need to establish a connection to the white space database so as to acquire a white space resource, and no new interface needs to be defined to support the PAWS protocol.

In the foregoing embodiment, if the white space resource request device determines that there is no white space resource available to be allocated to the white space device, an indication message used to indicate that no white space resource is available is sent to the white space device, and the white space device receives the indication message.

For example, when the white space resource request device determines that a white space resource pre-acquired from the white space database does not include a white space resource corresponding to the first white space requirement information of the white space device, or when, after performing a query in the white space database based on the first white space requirement information of the white space device, the white space resource request device does not acquire the white space resource corresponding to the first white space requirement information of the white space device, or when the white space resource request device performs a query in the white space database based on second white space requirement information of the white space resource request device and acquires an available white space resource supporting the white space resource request device but the available white space resource supporting the white space resource request device does not include the white space resource corresponding to the first white space requirement information of the white space device, or in a like situation, the indication message used to indicate that no white space resource is available is sent to the white space device, and the white space device receives the indication message.

In the foregoing embodiment of the present invention, an exchange message between the white space resource request device and the white space device is an RRC message, or a Diameter message, or the like. When establishing a connection to the white space resource request device, the white space device may also send a connection request establishment message that includes the first white space requirement information to the white space resource request device, where the first white space requirement information is white space frequency band information supported by the white space device and/or a parameter required for the white space database to allocate a resource to the white space device, which may be, for example, information such as white space frequency band information and/or location information or transmit power that represents a white space capability of the white space device, so that the white space resource request device allocates a white space resource to the white space device according to the requirement information; or when it is detected that a white space resource update needs to be performed on the white space device or when the white space resource request device requires the white space device to offload a service, an offloading service used to activate the white space device to use a white space resource, the white space resource request device sends a white space resource reconfiguration message to the white space device so as to update the white space resource, and the white space device receives the white space resource reconfiguration message to perform a white space resource update and sends a white space resource reconfiguration response message.

In the foregoing embodiment of the present invention, the white space resource request device may also be connected to the white space database by using a proxy device (hereinafter referred to as a proxy); the white space database is responsible only for storing white space data in a relatively large area (such as a country) and allocating a spectrum resource to the proxy; more specific functions such as execution of a white space allocation policy and white space decision are performed by the proxy. A supervision organization responsible for an area may be responsible for operation and maintenance of a proxy; or a telecom operator or some branches obtained authorization may be responsible for the operation and maintenance. These operation and maintenance entities formulate different white space allocation policies for proxies for which the entities are responsible. For the database, many proxies are connected to the database, and each proxy is responsible for white space allocation work of a sub-area within a coverage area of the database, where overlapping between areas for which different proxies are responsible is allowed.

A proxy may acquire white space channel information of an area for which the proxy is responsible from the database in the following two different manners: (1) the database periodically sends a spectrum update message to the proxy to update white space data in the proxy, that is, a push manner; (2) the proxy actively sends a spectrum data update request to the database as required, that is, a pull manner. The proxy stores all white space data information (obtained from the database) in the area for which the proxy is responsible and spectrum management stipulation information of the area for which the proxy is responsible, may apply for and acquire available spectrum information that is in the white space database and that is in the area for which the proxy is responsible, and perform spectrum allocation calculation according to information in a spectrum request message transferred by a master with reference to a corresponding spectrum allocation policy, so as to allocate a spectrum resource to the master.

In the foregoing embodiment of the present invention, the white space device may establish a connection to the white space resource request device based on the PAWS protocol or another existing protocol, and the white space resource request device establishes a connection to the white space database or the proxy based on the PAWS protocol, so that the white space device does not need to establish a connection to the white space database so as to acquire a white space resource, and no new interface needs to be defined to support the PAWS protocol.

In the foregoing embodiment of the present invention, multiple white space devices may be connected to the white space resource request device, and the multiple white space devices each request a white space resource from the white space resource request device, and separately report their own white space capability information such as white space frequency band information, location information, and transmit power. The white space resource request device sets the white space capability information as a policy of the white space resource request device, queries available white space information in the white space database according to the policy of the white space resource request device, and stores the available white space information. The white space device sends a request to the white space resource request device as required, and the white space resource request device returns a response message that carries white space frequency band information supporting the white space device that initiates the request. Specifically, the white space device may be, for example, a master white space device or a slave white space device. A master white space device may establish a connection to the white space resource request device based on an existing protocol, so as to acquire a white space resource. In addition to establishing a connection to the white space resource request device based on an existing protocol, a slave white space device may also be connected to a master white space device, and acquire an available white space resource by using the master white space device.

With reference to a specific application scenario, the following describes in detail specific implementation of this method embodiment of the present invention.

Figure 3A:
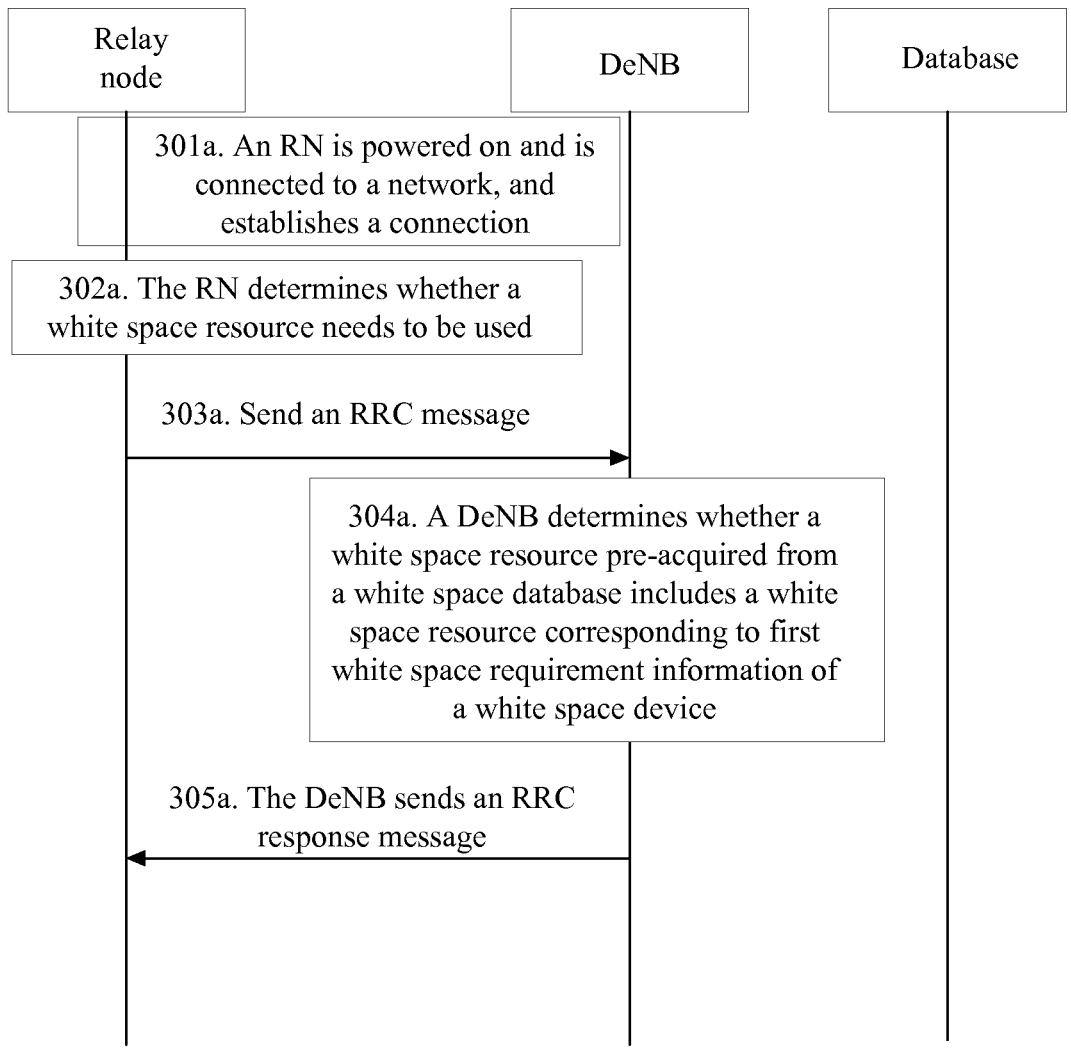
FIG. 3A is a flowchart of first signaling of a method, applied to a Hetnet application scenario in 3GPP, of the present invention.

FIG. 3A is a flowchart of first signaling of a method, applied to a Hetnet application scenario in 3GPP, of the present invention. In the 3rd Generation Partnership Project (3GPP), a relay node (RN) is a white space device, a donor eNodeB (DeNB) is a white space resource request device, and a white space resource request message is carried in a radio resource control message (RRC message). As shown in FIG. 3A, a technical solution of this embodiment includes the following steps.

Step 301*a*: The RN is powered on and is connected to a network, and establishes a connection.

The RN is powered on and is connected to a network, establishes an RRC connection to the DeNB, and performs communication. A used radio resource may be any resource except a white space resource.

Step 302*a*: The RN determines whether a white space resource needs to be used.

The RN determines, according to information such as a current geographic location or required bandwidth of the RN, whether a white space resource needs to be used. If a currently used spectrum meets a requirement of the RN, a current status is maintained; otherwise, a white space resource negotiation procedure is initiated to the DeNB.

Step 303*a*: Send an RRC message.

The RN sends the RRC message to the DeNB, where the message carries at least other information, except location information, that is required for acquiring a white space resource and that is supported by the RN, for example, a white space frequency band and transmit power; and the DeNB receives the RRC message.

Step 304*a*: The DeNB determines whether a white space resource pre-acquired from a white space database includes a white space resource corresponding to first white space requirement information of the RN.

Step 305*a*: The DeNB sends an RRC response message.

If a required white space frequency band exists, the RRC response message is sent to the RN, where the response message carries an acquired white space frequency band; if no required white space frequency exists, an RRC failure message is sent to the RN, to indicate that no white space frequency band is available.

In this embodiment, the RN performs communication with the DeNB based on RRC, and the DeNB has recently executed the PAWS protocol to perform a query in the white space database and has pre-stored an available white space resource supporting the white space resource request device; therefore, the DeNB in this embodiment does not need to establish a connection to the white space database to query a white space resource that supports using by the DeNB. However, in another embodiment, the DeNB may also directly perform a query in the white space database according to a received white space request message and acquire an available white space resource supported by the RN, and may also acquire, from the white space database, and store the available white space resource supporting the DeNB in advance.

Figure 3B:
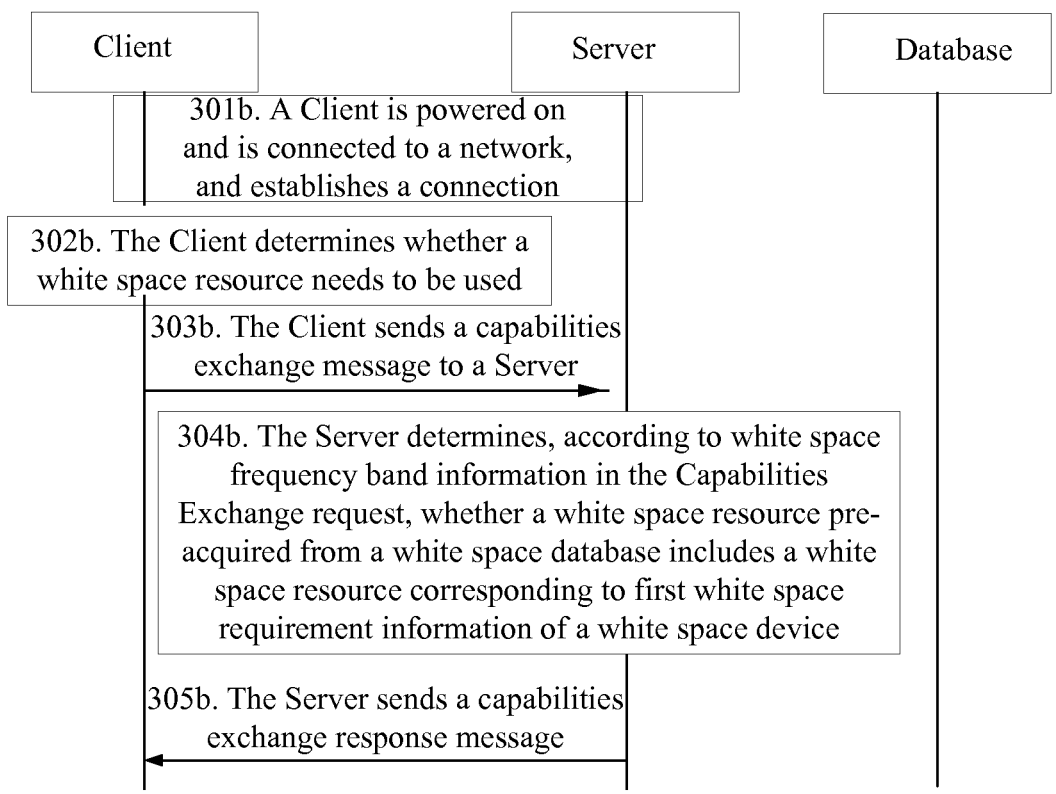
FIG. 3B is a flowchart of first signaling of a method embodiment, applied to an IETF scenario, of the present invention.

FIG. 3B is a flowchart of first signaling of a method embodiment, applied to an IETF scenario, of the present invention. In the Internet Engineering Task Force (hereinafter referred to as IETF), a client is a white space device, a server is a white space resource request device, and a white space resource request message is carried in a capabilities exchange message. As shown in FIG. 6B, a technical solution of this embodiment includes:

Step 301*b*: The client is powered on and is connected to a network, and establishes a connection.

Step 302*b*: The client determines whether a white space resource needs to be used.

Step 303*b*: The client sends a capabilities exchange request to the server.

The message carries at least information that is required for acquiring a white space resource and that supports the client, for example, a white space frequency band and a geographic location; and the server receives the Capabilities Exchange request.

Step 304*b*: The server determines, according to white space frequency band information in the Capabilities Exchange request, whether a white space resource pre-acquired from a white space database includes a white space resource corresponding to first white space requirement information of the white space device.

Step 305*b*: The server sends a capabilities exchange answer.

If a required white space frequency band exists, the Capabilities Exchange Answer is sent to the client, where the response message carries an acquired white space frequency band; otherwise, a Capabilities Exchange Answer failure message is sent, to indicate that no white space frequency band is available.

In this embodiment, the client performs communication with the server based on the Diameter protocol (diameter protocol), and the server performs communication with the white space database based on PAWS. In this embodiment, the server has recently executed the PAWS protocol to perform a query in the white space database and has pre-stored an available white space resource supporting the server Therefore, in this embodiment, the server does not need to establish a connection to the white space database to query a white space resource that supports using by the server. However, in another embodiment, the server may also directly perform a query in the white space database according to a received white space request message and acquire an available white space resource supported by the client, and may also acquire, from the white space database, and store an available white space resource list supporting the server in advance.

Figure 4A:
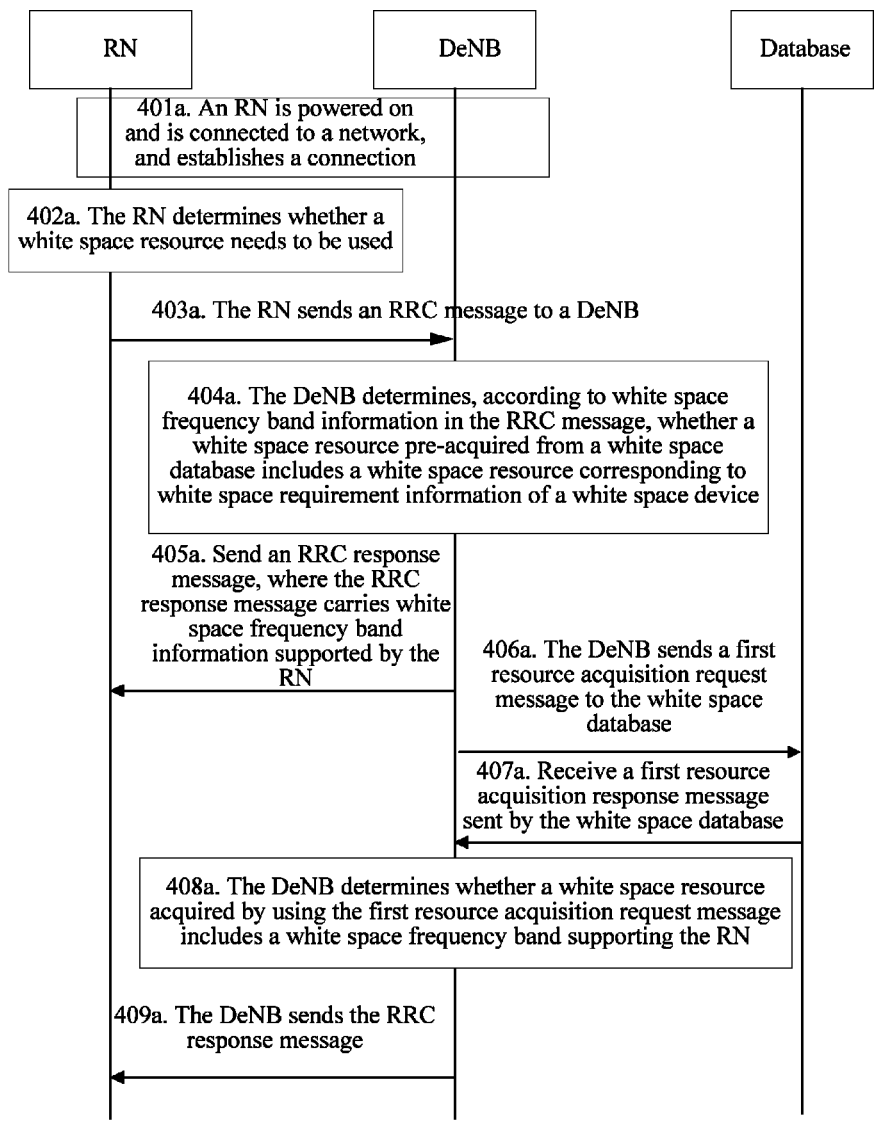
FIG. 4A is a flowchart of second signaling of a method, applied to a Hetnet application scenario in 3GPP, of the present invention.

FIG. 4A is a flowchart of second signaling of a method, applied to a Hetnet application scenario in 3GPP, of the present invention. A difference between this embodiment and the embodiment of FIG. 3A lies in that a white space resource request message further carries location information. If a white space resource pre-acquired from a white space database does not include a white space resource corresponding to white space requirement information of a white space device, a white space resource request device sends a first resource acquisition request message to the white space database, where the first resource acquisition request message includes the location information; and performs a query in the white space database according to the location information, so as to acquire an available white space resource list at a location indicated by the location information. As shown in FIG. 4A, a technical solution of this embodiment includes the following steps.

Step 401a: An RN is powered on and is connected to a network, and establishes a connection.

Step 402a: The RN determines whether a white space resource needs to be used.

For steps 401a and 402a, refer to steps 301a and 302a in FIG. 3A, and details are not described herein again.

Step 403a: The RN sends an RRC message to a DeNB.

The message carries at least information supporting the RN, for example, a white space frequency band and a geographic location; and the DeNB receives the RRC message.

Step 404a: The DeNB determines, according to white space frequency band information in the RRC message, whether a white space resource pre-acquired from a white space database includes a white space resource corresponding to white space requirement information of a white space device.

Step 405a: Send an RRC response message, where the RRC response message carries white space frequency band information supported by the RN.

If the DeNB determines, in step 404a, that the white space resource pre-acquired from the white space database includes a corresponding white space frequency band, the RRC response message is sent to the RN, where the RRC response message carries the white space frequency band supported by the RN.

Step 406a: The DeNB sends a first resource acquisition request message to the white space database.

If the DeNB determines, in step 404a, that the white space resource pre-acquired from the white space database does not include the corresponding white space frequency band, the first resource acquisition request message is sent to the white space database according to the RRC message received in step 403a, where the first resource acquisition request message carries white space requirement information of the RN. Specifically, the DeNB establishes a connection to the white space database base on the PAWS protocol; the DeNB initiates a request message to request to establish a connection to the white space database; the white space database responds, so as to establish a connection.

407a: Receive a first resource acquisition response message sent by the white space database.

The DeNB initiates a query request to the white space database, and performs a query in the white space database based on the RRC message, so as to acquire an available white space resource. If there is an available white space resource, the white space database sends the first resource acquisition response message to the DeNB, and the DeNB stores a white space resource that is based on the white space device. For example, a query may be performed based on location information in the RRC message to check whether the white space database has an available white space resource list at a location indicated by the location information.

Step 408a: The DeNB determines whether a white space resource acquired by using the first resource acquisition request message includes a white space frequency band supporting the RN.

Step 409a: The DeNB sends an RRC response message.

If a required white space frequency band exists, the RRC response message is sent to the RN, where the response message carries an acquired white space frequency band; otherwise, an RRC failure message is sent to the RN, to indicate that no white space frequency band is available.

In this embodiment, the RN performs communication with the DeNB based on RRC; the DeNB performs communication with the white space database based on PAWS; the DeNB sends the first resource acquisition request message that includes the white space requirement information of the RN to the white space database and stores the request message, and determines whether the white space resource acquired by using the first resource acquisition request message includes the white space frequency band supporting the RN.

Figure 4B:
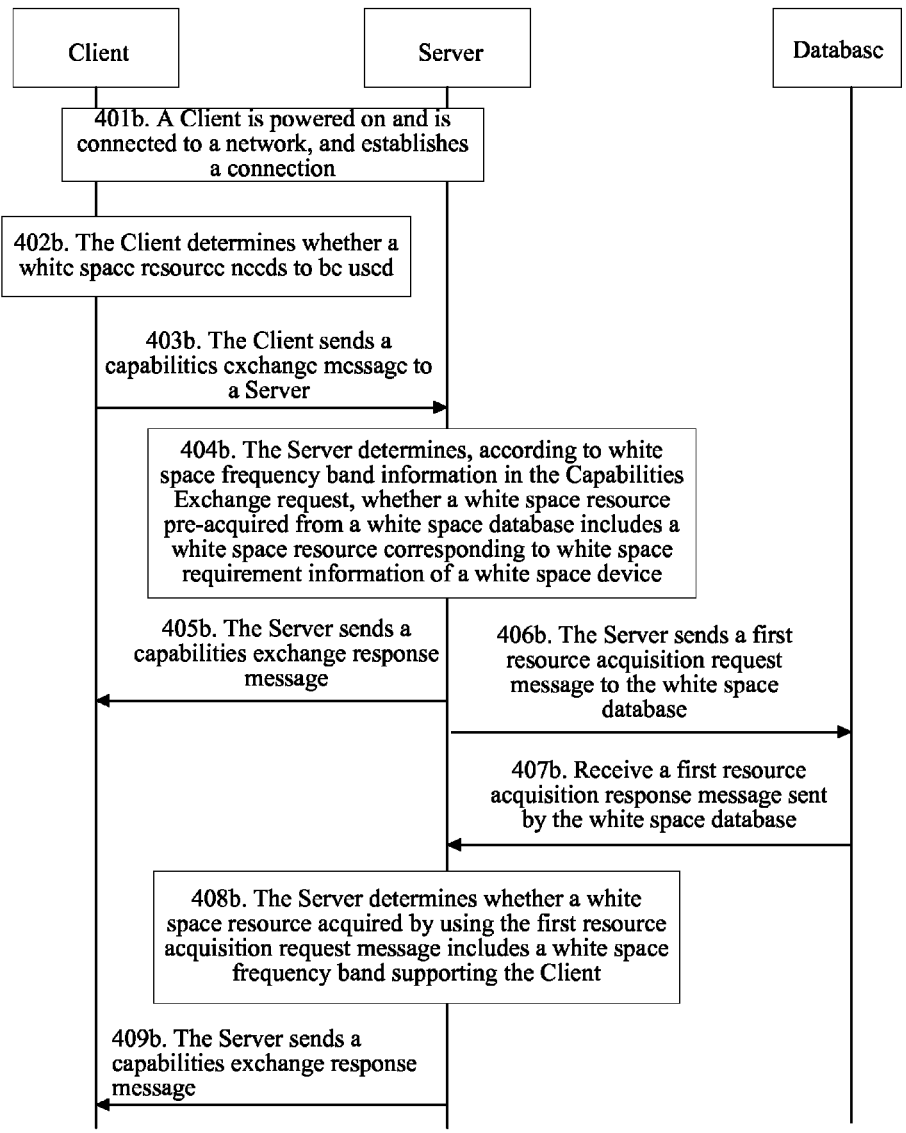
FIG. 4B is a flowchart of second signaling of a method embodiment, applied to an IETF scenario, of the present invention.

FIG. 4B is a flowchart of second signaling of a method embodiment, applied to an IETF scenario, of the present invention. In the Internet Engineering Task Force (hereinafter referred to as IETF), a client is a white space device; a server is a white space resource request device, and a white space resource request message is carried in a capabilities exchange message. As shown in FIG. 4B, a technical solution of this embodiment includes:

Step 401b: The client is powered on and is connected to a network, and establishes a connection.

Step 402b: The client determines whether a white space resource needs to be used.

Step 403b: The client sends a capabilities exchange message (Capabilities Exchange request) to the server.

The message carries at least information supporting the client, for example, a white space frequency band and a geographic location; and the server receives the Capabilities Exchange request.

Step 404b: The server determines, according to white space frequency band information in the Capabilities Exchange request, whether a white space resource pre-acquired from the RN includes a white space resource corresponding to white space requirement information of the white space device.

Step 405b: The server sends a capabilities exchange answer.

If the server determines, in step 404b, that the white space resource pre-acquired from the white space database includes a corresponding white space frequency band, the capabilities exchange answer is sent to the client, where the Capabilities Exchange Answer carries a white space frequency band supporting the client.

Step 406b: The server sends a first resource acquisition request message to the white space database.

In this step, if the serve determines, in step 404b, that a first available white space resource list does not include the corresponding white space frequency band, the first resource acquisition request message is sent to the white space database according to the Capabilities Exchange request received in step 403b, where the first resource acquisition request message carries white space requirement information of the client. Specifically, the server establishes a connection to the white space database based on the PAWS protocol; the server initiates a request message to request to establish a connection to the PAWS; the PAWS responds, so as to establish a connection.

407b: Receive a first resource acquisition response message sent by the white space database.

The server initiates a query request to the white space database, and a query is performed in the white space database based on the Capabilities Exchange request, so as to acquire an available white space resource. If there is an available white space resource, the white space database sends the first resource acquisition response message to the server, and the server stores a white space resource that is based on the RN. For example, a query may be performed based on location information in the Capabilities Exchange request to check whether the white space database has an available white space resource list at a location indicated by the location information.

Step 408b: The server determines whether a white space resource acquired by using the first resource acquisition request message includes a white space frequency band supporting the client.

Step 409b: The server sends a capabilities exchange answer.

If a required white space frequency band exists, the Capabilities Exchange Answer is sent to the client, where the response message carries an acquired white space frequency band; if no required white space frequency exists, a Capabilities Exchange Answer failure message is sent, to indicate that no white space frequency band is available.

In this embodiment, the client performs communication with the server based on the Diameter protocol; the server performs communication with the white space database based on PAWS; the server sends the first resource acquisition request message that includes the white space requirement information of the client to the white space database and stores the request message, and determines whether the white space resource acquired by using the first resource acquisition request message includes the white space frequency band supporting the client.

Figure 5:
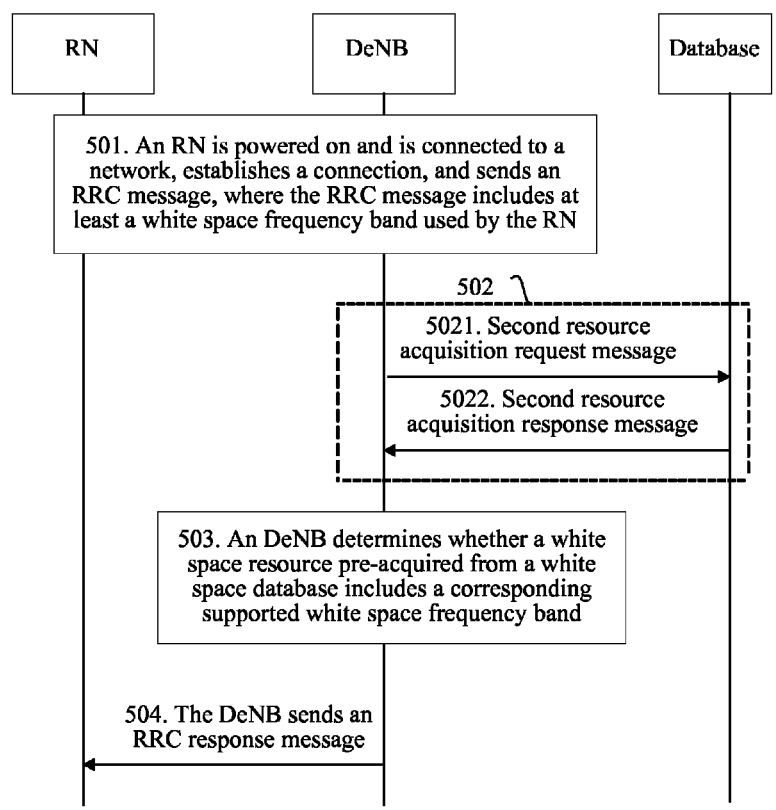
FIG. 5 is a flowchart of third signaling of a method, applied to a Hetnet application scenario in 3GPP, of the present invention.

FIG. 5 is a flowchart of third signaling of a method, applied to a Hetnet application scenario in 3GPP, of the present invention. This embodiment is similar to the embodiments of FIG. 3A and FIG. 4A, and a difference only lies in that in this embodiment, when establishing a connection to an RN, a DeNB receives a white space resource request RRC message sent by the RN. Specifically, this embodiment includes the following steps.

Step 501: The RN is powered on and is connected to a network, establishes a connection, and sends an RRC message, where the RRC message includes at least white space frequency band information that supported by the RN.

Different from FIG. 3A and FIG. 4A, in this embodiment, when the RN is powered on and is connected to a network, the RN establishes an RRC connection to the DeNB and indicates a white space capability of the RN in a process of establishing the connection, that is, notifies the DeNB of a white space frequency band supported by the RN.

Step 503: The DeNB determines whether a white space resource pre-acquired from a white space database includes a corresponding white space frequency band.

Step 504: The DeNB sends an RRC response message.

If a required white space frequency band exists, the RRC response message is sent to the RN, where the response message carries an acquired white space frequency band; otherwise, an RRC failure message is sent to the RN, to indicate that no white space frequency band is available.

In another embodiment of the present invention, before determining whether the white space resource pre-acquired from the white space database includes a white space frequency band supported by the RN, the DeNB may further initiate a query procedure to the white space database, to query and acquire a first available white space resource list supporting the white space device. Specifically, refer to FIG. 5 again. This embodiment further includes the following steps.

Step 502: Query, according to a policy of the DeNB itself, a white space resource supporting the DeNB. Specifically, step 502 includes the following steps.

Step 5021: The DeNB sends a second resource acquisition request message to a white space database.

The DeNB initiates the request message to request to establish a connection to the PAWS, and the PAWS responds, so as to establish a connection.

Step 5022: Receive a second resource acquisition response message sent by the white space database.

The DeNB initiates a query request to the white space database, and performs a query according to the policy of the DeNB to check whether the white space database has an available white space resource supporting the DeNB. If yes, the available white space resource are acquired and stored.

Generally, the second resource acquisition request message is used by a white space resource request device to request, from the white space database according to a policy of the white space resource request device, a white space resource that supports the white space resource request device, to determine whether there is a white space frequency band supporting the RN in the available white space resource supporting the white space resource request device; the first resource acquisition request message includes first white space requirement information of the white space device.

In still another embodiment of a white space resource acquisition method in the present invention, for a white space device that has used a white space resource, when the white space resource needs to be updated, the white space resource request device may further send a white space reconfiguration message to the white space device, to update the white space used by the white space device. For details, reference may be made to FIG. 6.

Figure 6:
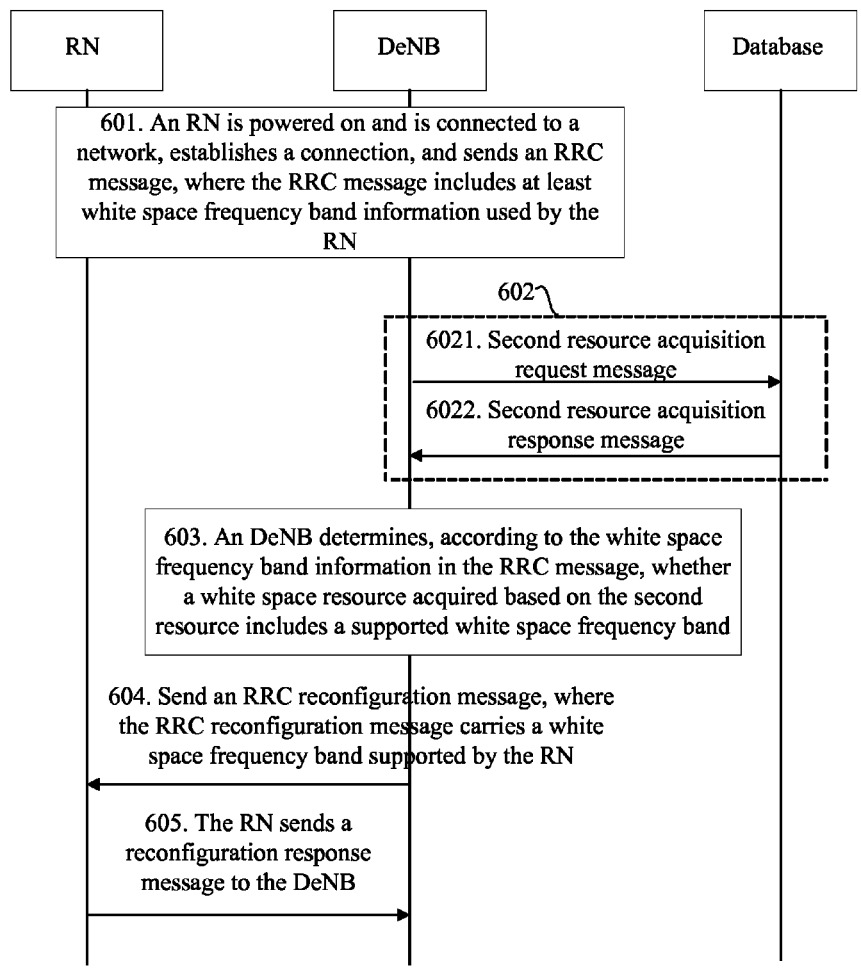
FIG. 6 is a flowchart of fourth signaling of a method, applied to a Hetnet application scenario in 3GPP, of the present invention.

FIG. 6 is a flowchart of fourth signaling of a method, applied to a Hetnet application scenario in 3GPP, of the present invention. A difference between the embodiment of FIG. 6 and the embodiment of FIG. 5 lies in that, when detecting that a white space resource used by an RN needs to be updated, a DeNB sends a white space reconfiguration message to the RN and reconfigures the white space resource used by the RN. As shown in FIG. 6, this embodiment includes the following steps:

Step 601: The RN is powered on and is connected to a network, establishes a connection, and sends an RRC message, where the RRC message includes at least white space frequency band information used by the RN.

Step 602: Query, according to a policy of the DeNB itself, a white space resource supporting the DeNB. Specifically, step 602 includes the following steps.

Step 6021: The DeNB sends a second resource acquisition request message to a white space database.

The DeNB initiates the request message to request to establish a connection to the PAWS, and the PAWS responds, so as to establish a connection.

Step 6022: Receive a second resource acquisition response message sent by the white space database.

Step 603: The DeNB determines, according to the white space frequency band information in the RRC message, whether a white space resource acquired based on the second resource acquisition request message includes a supported white space frequency band.

For the foregoing step 601 to step 603, reference may be made to step 501 to step 503 shown in FIG. 5, and details are not described herein again.

Step 604: Send an RRC reconfiguration message, where the RRC reconfiguration message carries a white space frequency band supported by the RN.

When detecting that a white space currently used by the RN affects spectrum usage of an original user, the DeNB needs to actively initiate a white space resource reconfiguration message to the RN, so as to update the white space frequency band used by the RN, where the reconfiguration message carries a white space frequency band to be used by the RN.

Step 605: The RN sends a reconfiguration response message to the DeNB, where the reconfiguration response message carries updated white space frequency band information of the RN, and notifies the DeNB of a used white space frequency band.

In another embodiment, the reconfiguration message may also be sent after the DeNB performs a query in the white space database; that is, after a first resource acquisition request message is sent to the white space database and a first resource acquisition response message fed back by the white space database is received, and it is determined whether a acquired white space resource has the white space frequency band supported by the RN. If the RN has recently executed the PAWS protocol to query an available white space resource in the white space database, a query may not be performed again in the white space database.

In the foregoing embodiment, the present invention is described in an example in which the white space resource request device is a DeNB in a 3GPP heterogeneous network and a server based on the Diameter protocol, and the white space device is an RN and a client. The DeNB establishes a connection to the RN based on the RRC protocol so as to perform communication; the server establishes a connection to the client based on the Diameter protocol; the DeNB or the server serves as the white space resource request device, and performs communication with the white space database or a proxy device based on the PAWS protocol, so as to acquire a white space resource. However, the present invention is not limited thereto. In another embodiment, the white space resource request device and the white space device may be, for example, a mobile communications network node such as a picocell base station (hereinafter referred to as pico) or a femtocell base station (hereinafter referred to as Femto).

Figure 7:
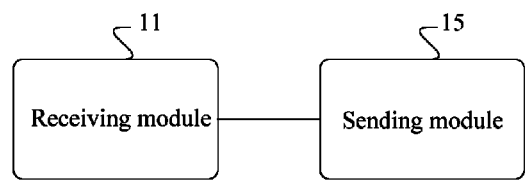
FIG. 7 is a schematic structural diagram of Embodiment 1 of a white space resource request device for white space resource acquisition according to the present invention.

FIG. 7 is a schematic structural diagram of Embodiment 1 of a white space resource request device for white space resource acquisition according to the present invention. As shown in FIG. 7, the device in this embodiment may include a receiving module 11, configured to receive a white space resource request message sent by a white space device; and a sending module 15, configured to, after the receiving module 11 receives the white space resource request message, send a white space resource response message to the white space device, where the white space resource response message includes white space resource information that is requested from a white space database and that is corresponding to first white space requirement information of the white space device.

The white space resource request device in this embodiment may be used to execute the technical solution of the method embodiment shown in FIG. 1. Implementation principles and technical effects are similar, and details are not described herein again.

Figure 8:
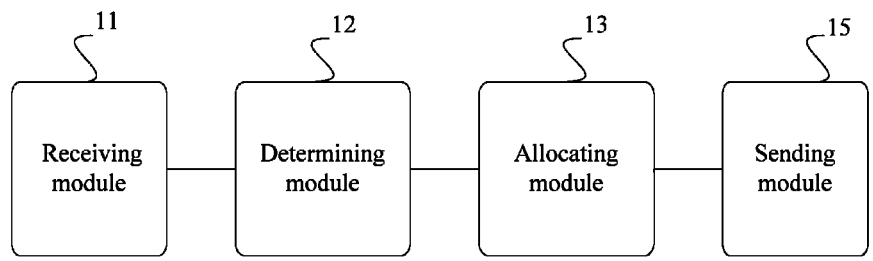
FIG. 8 is a schematic structural diagram of Embodiment 2 of a white space resource request device for white space resource acquisition according to the present invention.

FIG. 8 is a schematic structural diagram of Embodiment 2 of a white space resource request device for white space resource acquisition according to the present invention. As shown in FIG. 8, the white space resource request device in this embodiment may further include a determining module 12 and an allocating module 13.

The determining module 12 is configured to determine whether a white space resource pre-acquired from the white space database includes a white space resource corresponding to the first white space requirement information of the white space device.

The allocating module 13 is configured to, after the determining module 12 determines that the white space resource pre-acquired from the white space database includes the white space resource corresponding to the first white space requirement information of the white space device, allocate, to the white space device, the white space resource corresponding to the white space requirement information of the white space device.

Further, the sending module 15 is further configured to, after the determining module 12 determines that the white space resource pre-acquired from the white space database does not include the white space resource corresponding to the first white space requirement information of the white space device, send the white space device an indication message used to indicate that no white space resource is available.

In the foregoing embodiment, when the determining module 12 determines that an available white space resource pre-acquired from the white space database does not include an available white space resource corresponding to the first white space requirement information of the white space device, the sending module 15 sends a first resource acquisition request message to the white space database according to the received white space resource request message, where the first resource acquisition request message carries the first white space requirement information of the white space device. The white space resource request device performs a query in the database according to the first resource acquisition request message, provides feedback, and sends a first resource acquisition response message to the receiving module 11, where the first resource acquisition response message carries the white space resource corresponding to the first white space requirement information of the white space device.

Figure 9:
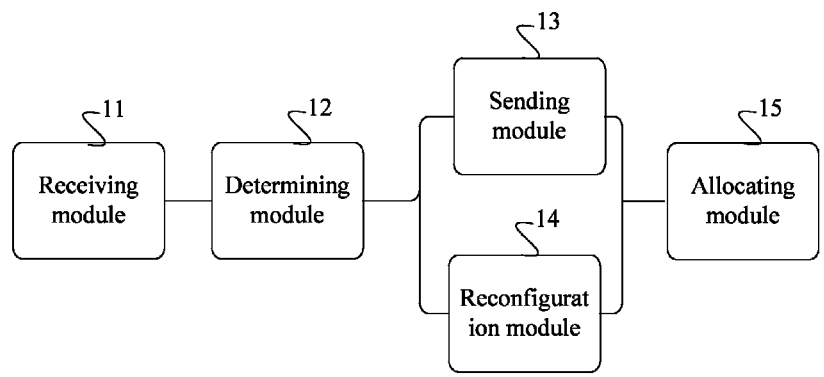
FIG. 9 is a schematic structural diagram of a third Embodiment of a white space resource request device for white space resource acquisition according to the present invention.

FIG. 9 is a schematic structural diagram of Embodiment 3 of a white space resource request device for white space resource acquisition according to the present invention. As shown in FIG. 9, the white space resource request device in this embodiment may further include a reconfiguration module 14.

The white space resource request device may periodically monitor the white space device, and when a condition such as an exception occurs in a network, for example, when a white space currently used by the white space device has expired or the white space device needs to be activated according to a pre-defined policy, the reconfiguration module 14 sends a white space resource reconfiguration message to the white space device, where the white space resource reconfiguration message includes the white space resource corresponding to the first white space requirement information of the white space device. After receiving the white space resource reconfiguration message, the white space device sends a white space resource reconfiguration response message; the receiving module 11 is further configured to: before the reconfiguration module 14 sends the white space resource reconfiguration message, receive the white space resource request message sent by the white space device, where the white space resource request message includes the first white space requirement information of the white space device.

In the foregoing embodiment, before determining whether the white space resource pre-acquired from the white space database includes the white space resource corresponding to the first white space requirement information of the white space device, the determining module 12 may initiate a query in the white space database according to a policy of the determining module 12, so as to acquire a white space resource. Specifically, for example, if the PAWS protocol has not been executed recently to acquire an available white space resource from the white space database, the sending module 15 may send a second resource acquisition request message that includes second white space requirement information of the white space resource request device to the white space database, perform a query in the database and acquire an available white space resource supporting the sending module 15. The white space database sends a second resource acquisition response message to the white space resource request device according to the second resource acquisition request message, where the second resource acquisition response message includes an available white space resource supporting the device; that is, the second resource acquisition response message includes a white space resource corresponding to the white space requirement information of the white space resource request device. The white space resource request message that is sent by the white space device and that is received by the receiving module 11 includes the first white space requirement information of the white space device.

In the foregoing embodiment of the present invention, before the receiving module 11 receives the white space resource request message sent by the white space device, the white space resource request device establishes a connection to the white space device. When establishing a connection to the white space resource request device, the white space device sends a connection request message that includes the first white space requirement information of the white space device to the receiving module 11, to report a white space capability of the white space device to the white space resource request device, so that the white space resource request device learns about the white space capability, such as white space frequency band information, location information, and transmit power, of the white space device at the time of establishing the connection, and the white space resource request device allocates an available white space resource to the white space device according to the first white space requirement information in the connection request message, or updates a white space used by the white space device when the white space needs to be updated.

In the foregoing embodiment, the first white space requirement information of the white space device includes white space frequency band information supported by the white space device and/or a parameter required for the white space database to allocate a resource to the white space device. For example, all white space capability information such as the white space frequency band information and/or the location information that can indicate the white space capability of the white space device; the second white space requirement information is white space information supported by the white space resource request device and/or a parameter required for the white space database to allocate a resource to the white space resource request device.

For a procedure for acquiring a white space resource by the white space resource request device provided in this embodiment of the present invention, reference may be made to the methods provided in the foregoing white space resource acquisition method embodiments, and details are not described herein again.

The white space resource request device provided in this embodiment of the present invention receives a white space resource request message sent by a white space device; requests, in advance or after receiving the white space resource request message, white space resource information corresponding to first white space requirement information of the white space device; and sends a slave device the white space resource information corresponding to the requirement information, so as to utilize a white space resource. In this embodiment of the present invention, the white space resource request device requests the white space resource information from a white space database based on the PAWS protocol, and interaction between the white space device and the white space resource request device can be established by using an existing protocol, so that the white space device does not need to establish a connection to the white space database so as to acquire a white space resource, and no new interface needs to be defined to support the PAWS protocol.

Figure 10:
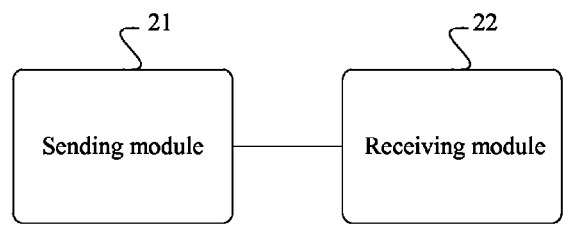
FIG. 10 is a schematic structural diagram of Embodiment 1 of a white space device for white space resource acquisition according to the present invention.

FIG. 10 is a schematic structural diagram of Embodiment 1 of a white space device for white space resource acquisition according to the present invention. As shown in FIG. 10, the white space device in this embodiment may include a sending module 21, configured to send a white space resource request message to a white space resource request device; and a receiving module 22, configured to, after the sending module 21 sends the white space resource request message, receive a white space resource response message sent by the white space resource request device, where the white space resource response message includes white space resource information that is requested by the white space resource request device from a white space database and that is corresponding to first white space requirement information of the white space device.

The white space device in this embodiment may be used to execute the technical solutions of the method embodiment shown in FIG. 2. Implementation principles and technical effects are similar, and details are not described herein again.

Further, if the white space resource request device determines that there is no white space resource available to be allocated to the white space device, the receiving module 22 is further configured to receive an indication message that is sent by the white space resource request device and that is used to indicate that no white space resource is available.

Figure 11:
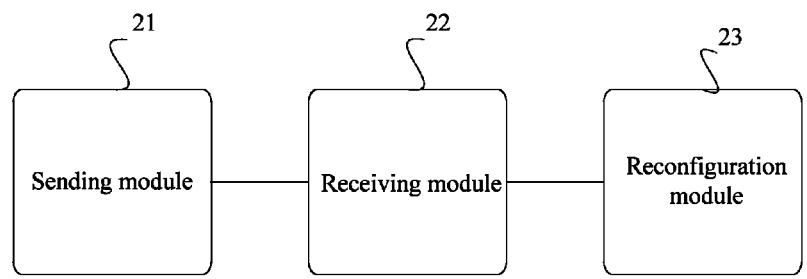
FIG. 11 is a schematic structural diagram of Embodiment 2 of a white space device for white space resource acquisition according to the present invention.

FIG. 11 is a schematic structural diagram of Embodiment 2 of a white space device for white space resource acquisition according to the present invention. As shown in FIG. 11, the white space device in this embodiment may include a reconfiguration module 23, configured to, after the receiving module 22 receives a white space resource reconfiguration message sent by the white space resource request device, send a white space resource reconfiguration response message to the white space resource request device, where the white space resource reconfiguration message includes a white space resource corresponding to the first white space requirement information of the white space device.

In the foregoing embodiment, the sending module 21 is further configured to send a white space resource request message to the white space resource request device, where the white space resource request message carries the first white space requirement information of the white space device. Specifically, the first white space requirement information may be sent to the white space resource request device after the white space device determines whether a white space needs to be used, and may also be carried in a connection request message and sent when a connection to the white space resource request device is established, to report a white space capability of the white space device to the white space resource request device, so that the white space resource request device allocates a white space resource to the white space device according to the requirement information in the white space resource request message or queries whether there is an appropriate white space resource in the white space database. In addition, a resource update is performed when a white space used by the white space device needs to be updated or when the white space resource request device actively initiates, when requiring the white space device to offload a service, an offloading service used to activate the white space device to use a white space resource.

The white space device provided in this embodiment of the present invention sends a white space resource request device a white space resource request message that carries second white space requirement information of the white space device, that is, indicates a white space capability of the white space device, and interaction between the white space device and the white space resource request device can be established by using an existing protocol, so that the white space device does not need to establish a connection to the white space database so as to acquire a white space resource, and no new interface needs to be defined to support the PAWS protocol.

Figure 12:
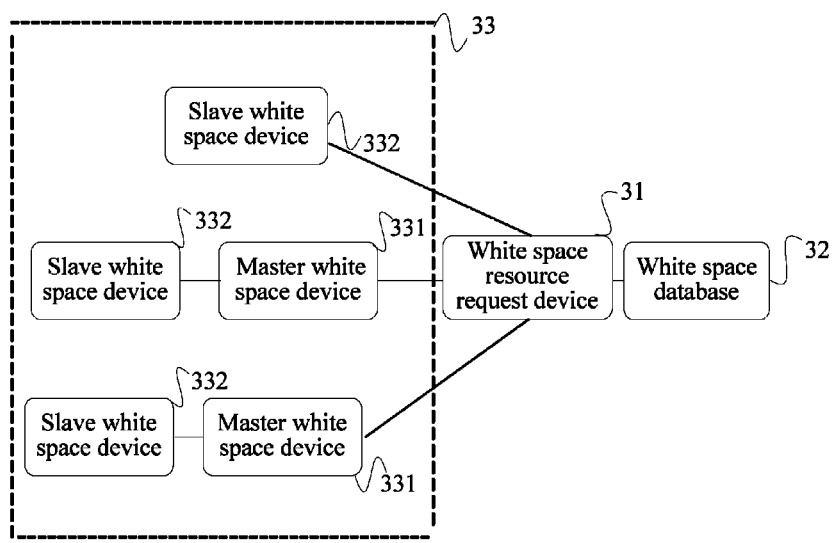
FIG. 12 is a schematic structural diagram of an embodiment of a white space resource acquisition system according to the present invention.

FIG. 12 is a schematic structural diagram of an embodiment of a white space resource acquisition system according to the present invention. As shown in FIG. 12, the system provided in this embodiment of the present invention includes: a white space resource request device 31, a white space database 32, and a white space device 33.

In the system shown in FIG. 12, the white space device 33 may directly establish a connection to the white space resource request device 31, and the white space resource request device 31 communicates with the white space database based on the PAWS protocol and is responsible for acquiring an available white space resource. However, the white space device 33 does not need to directly establish a connection to the white space database so as to acquire a white space resource, where communication may be performed based on an existing protocol except the PAWS protocol, for example, the RRC protocol or the Diameter protocol. Therefore, for the white space device, no new interface needs to be defined to support the PAWS protocol.

Specifically, in this embodiment of the present invention, the white space device 33 may be, for example, a master white space device 331 or a slave white space device 332. A master white space device 331 may establish a connection to the white space resource request device 31 based on an existing protocol, so as to acquire a white space resource. In addition to establishing a connection to the white space resource request device 31 based on an existing protocol, a slave white space device 332 may also be connected to a master white space device 331, and acquire an available white space resource by using the master white space device 331.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A white space resource acquisition method, comprising:
receiving, by a white space resource request device, a white space resource request message sent by a white space device, the white space resource request message requesting a white space resource allocation from the white space resource request device;
allocating, by the white space resource request device in response to the white space resource request message, a white space resource based on a first white space requirement information of the white space device, wherein the first white space requirement information comprises a parameter required for allocation of the white space resource to the white space device and the white space resource is requested by the white space resource request device from a white space database without a need of establishing a connection between the white space device and the white space database; and
sending, by the white space resource request device, a white space resource response message to the white space device, wherein the white space resource response message comprises information about the allocated white space resource.

2. The method according to claim 1, wherein allocating the white space resource based on the first white space requirement information of the white space device comprises:
determining, by the white space resource request device, whether a white space resource pre-acquired from the white space database comprises a white space resource corresponding to the first white space requirement information of the white space device; and
when the white space resource pre-acquired from the white space database comprises the white space resource corresponding to the first white space requirement information of the white space device, allocating, by the white space resource request device, the white space resource corresponding to the first white space requirement information of the white space device to the white space device.

3. The method according to claim 2, wherein allocating the white space resource based on the first white space requirement information of the white space device further comprises:
when the white space resource pre-acquired from the white space database does not comprise the white space resource corresponding to the first white space requirement information of the white space device,
sending, by the white space resource request device, a first resource acquisition request message to the white space database, wherein the first resource acquisition request message comprises the first white space requirement information of the white space device and the first resource acquisition request message requests allocation of the white space resource from the white space database in accordance with the first white space requirement information; and
receiving, by the white space resource request device, a first resource acquisition response message sent by the white space database, wherein the first resource acquisition response message comprises the white space resource allocated by the white space database corresponding to the first white space requirement information of the white space device.

4. The method according to claim 2, further comprising:
sending, by the white space resource request device, a second resource acquisition request message to the white space database, wherein the second resource acquisition request message comprises a second white space requirement information of the white space resource request device, the second resource acquisition request message requesting a second white space resource allocation to the white space resource request device, and the second white space requirement information comprising information based on which the white space database allocates white space resources to the white space resource request device; and
receiving, by the white space resource request device, a second resource acquisition response message sent by the white space database, wherein the second resource acquisition response message comprises a white space resource corresponding to the second white space requirement information of the white space resource request device.

5. The method according to claim 4, wherein the second white space requirement information comprises:
white space information supported by the white space resource request device and/or a parameter required for the white space database to allocate a resource to the white space resource request device.

6. The method according to claim 1, wherein
the white space resource request message comprises the first white space requirement information of the white space device.

7. The method according to claim 1, wherein the first white space requirement information comprises:
white space frequency band information supported by the white space device, location information of the white space device or transmit power of the white space device.

8. A white space resource acquisition method, comprising:
sending a white space resource request message to a white space resource request device, the white space resource request message requesting allocation of a white space resource from the white space resource request device; and
receiving a white space resource response message sent by the white space resource request device, wherein the white space resource response message comprises information of a white space resource allocated by the white space resource request device and the allocated white space resource is requested by the white space resource request device from a white space database corresponding to a first white space requirement information of a white space device, the first white space requirement information comprising a parameter required for allocation of a white space resource to the white space device.

9. The method according to claim 8, wherein
the white space resource request message comprises the first white space requirement information of the white space device.

10. The method according to claim 8, wherein the first white space requirement information comprises:
white space frequency band information supported by the white space device, location information of the white space device or transmit power of the white space device.

11. A white space resource request device, comprising:
a receiver, configured to receive a white space resource request message sent by a white space device, the white space resource request message requesting a white space resource allocation from the white space resource request device;
a processor configured to allocate, in response to the white space resource request message, a white space resource based on a first white space requirement information of the white space device, wherein the first white space requirement information comprises a parameter required for allocation of the white space resource to the white space device and the white space resource is requested from a white space database by the white space resource request device without a need of establishing a connection between the white space device and the white space database; and
a transmitter, configured to send a white space resource response message to the white space device, wherein the white space resource response message comprises information about the allocated white space resource.

12. The white space resource request device according to claim 11, wherein
the processor is further configured to determine whether a white space resource pre-acquired from the white space database comprises a white space resource corresponding to the first white space requirement information of the white space device, and when determining that the white space resource pre-acquired from the white space database comprises the white space resource corresponding to the first white space requirement information of the white space device, allocate, to the white space device, the white space resource corresponding to the first white space requirement information of the white space device.

13. The white space resource request device according to claim 12,
wherein the transmitter is further configured to, when the processor determines that the white space resource pre-acquired from the white space database does not comprise the white space resource corresponding to the first white space requirement information of the white space device, send a first resource acquisition request message to the white space database, wherein the first resource acquisition request message comprises the first white space requirement information of the white space device, and the first resource acquisition request message requests allocation of the white space resource from the white space database in accordance with the first white space requirement information; and wherein the receiver is configured to, after the transmitter sends the first resource acquisition request message, receive a first resource acquisition response message sent by the white space database, wherein the first resource acquisition response message comprises the white space resource allocated by the white space database corresponding to the first white space requirement information of the white space device.

14. The white space resource request device according to claim 12, wherein the transmitter is further configured to send a second resource acquisition request message to the white space database, and receive a second resource acquisition response message sent by the white space database, wherein the second resource acquisition request message comprises a second white space requirement information determined by the processor, and the second resource acquisition response message comprises a white space resource corresponding to the second white space requirement information of the white space resource request device, the second resource acquisition request message requesting a second white space resource allocation to the white space resource request device, and the second white space requirement information comprising information based on which the white space database allocates white space resources to the white space resource request device.

15. The white space resource request device according to claim 14, wherein the second white space requirement information determined by the processor comprises white space information supported by the white space resource request device and/or a parameter required for the white space database to allocate a resource to the white space resource request device.

16. The white space resource request device according to claim 11, wherein the white space resource request message that is sent by the white space device comprises the first white space requirement information of the white space device.

17. The white space resource request device according to claim 11, wherein the first white space requirement information comprises white space frequency band information supported by the white space device, location information of the white space device or transmit power of the white space device.

18. A white space device, comprising:
 a transmitter, configured to send a white space resource request message to a white space resource request device, the white space resource request message requesting allocation of a white space resource from the white space resource request device; and
 a receiver, configured to, receive a white space resource response message sent by the white space resource request device, wherein the white space resource response message comprises information of a white space resource allocated by the white space resource request device and the allocated white space resource is requested by the white space resource request device from a white space database corresponding to a first white space requirement information of the white space device, the first white space requirement information comprising a parameter required for allocation of a white space resource to the white space device.

19. The white space device according to claim 18, wherein the white space resource request message comprises the first white space requirement information of the white space device.

20. The white space device according to claim 18, wherein the first white space requirement information comprises white space frequency band information supported by the white space device, location information of the white space device or transmit power of the white space device.

* * * * *